July 14, 1964
C. M. ALLEN
3,140,563
PROTECTIVE COVER FOR PLANTS
Filed April 3, 1963
4 Sheets-Sheet 1
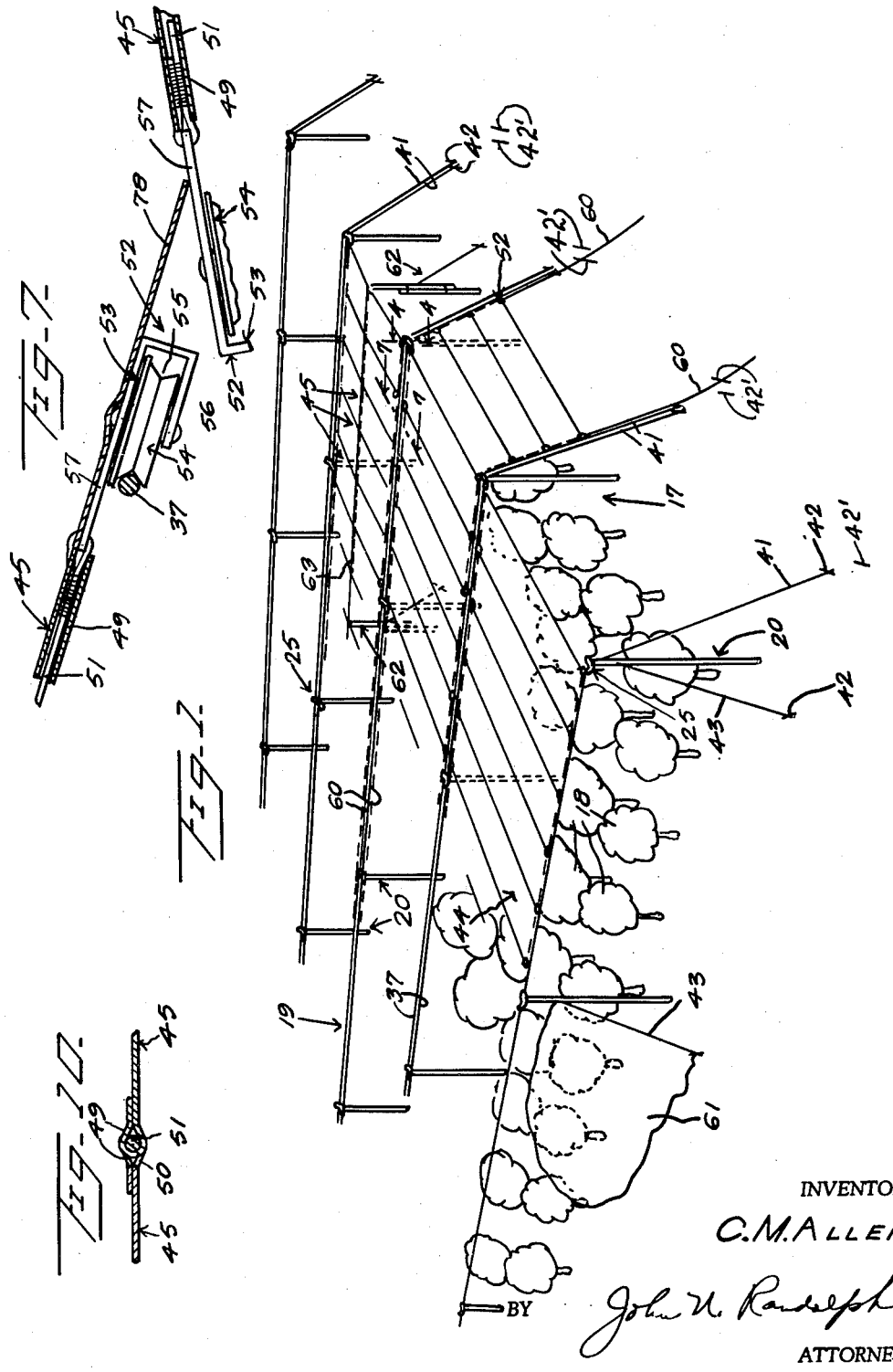
INVENTOR
C. M. ALLEN
BY John U. Randolph
ATTORNEY

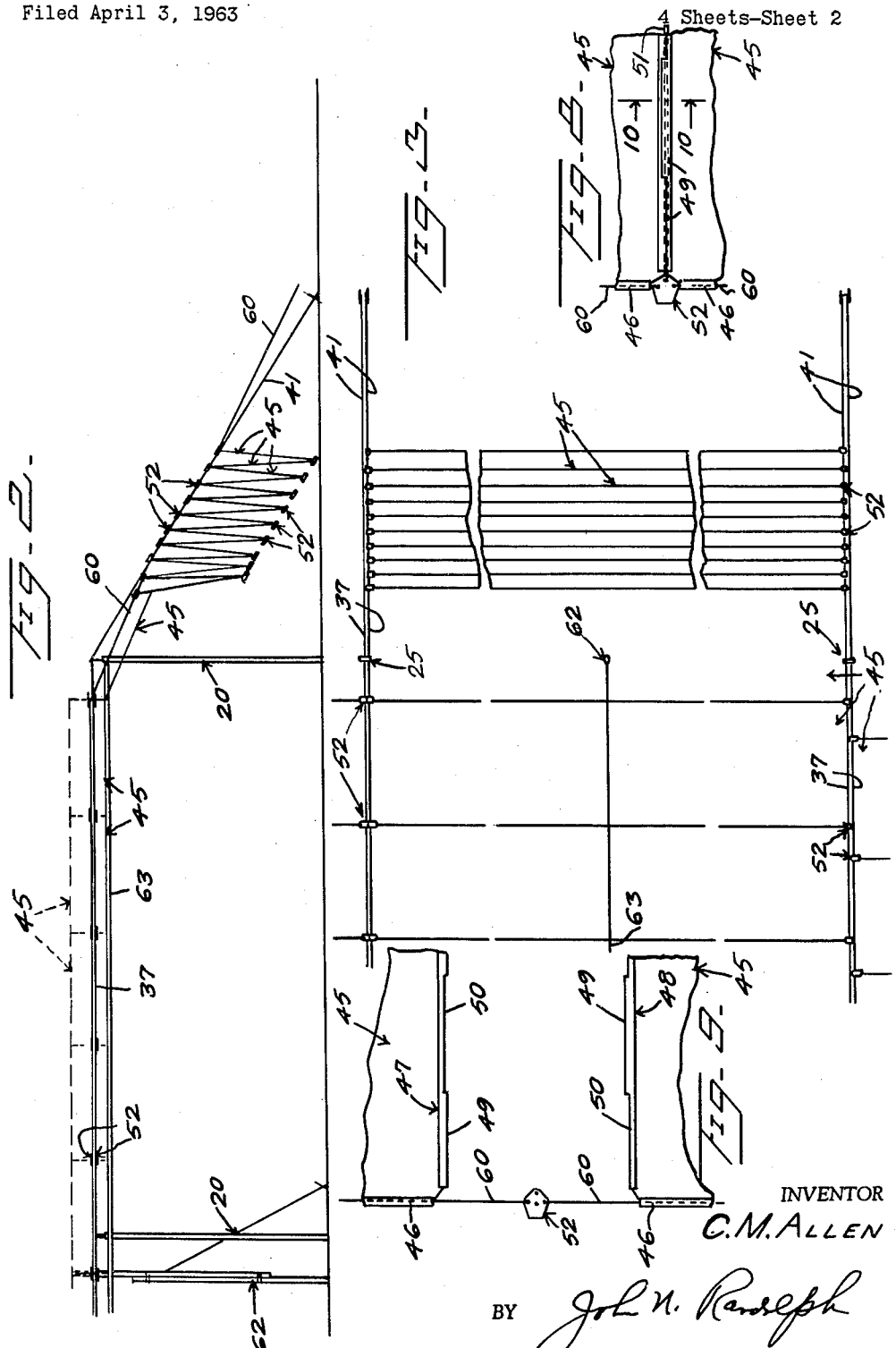

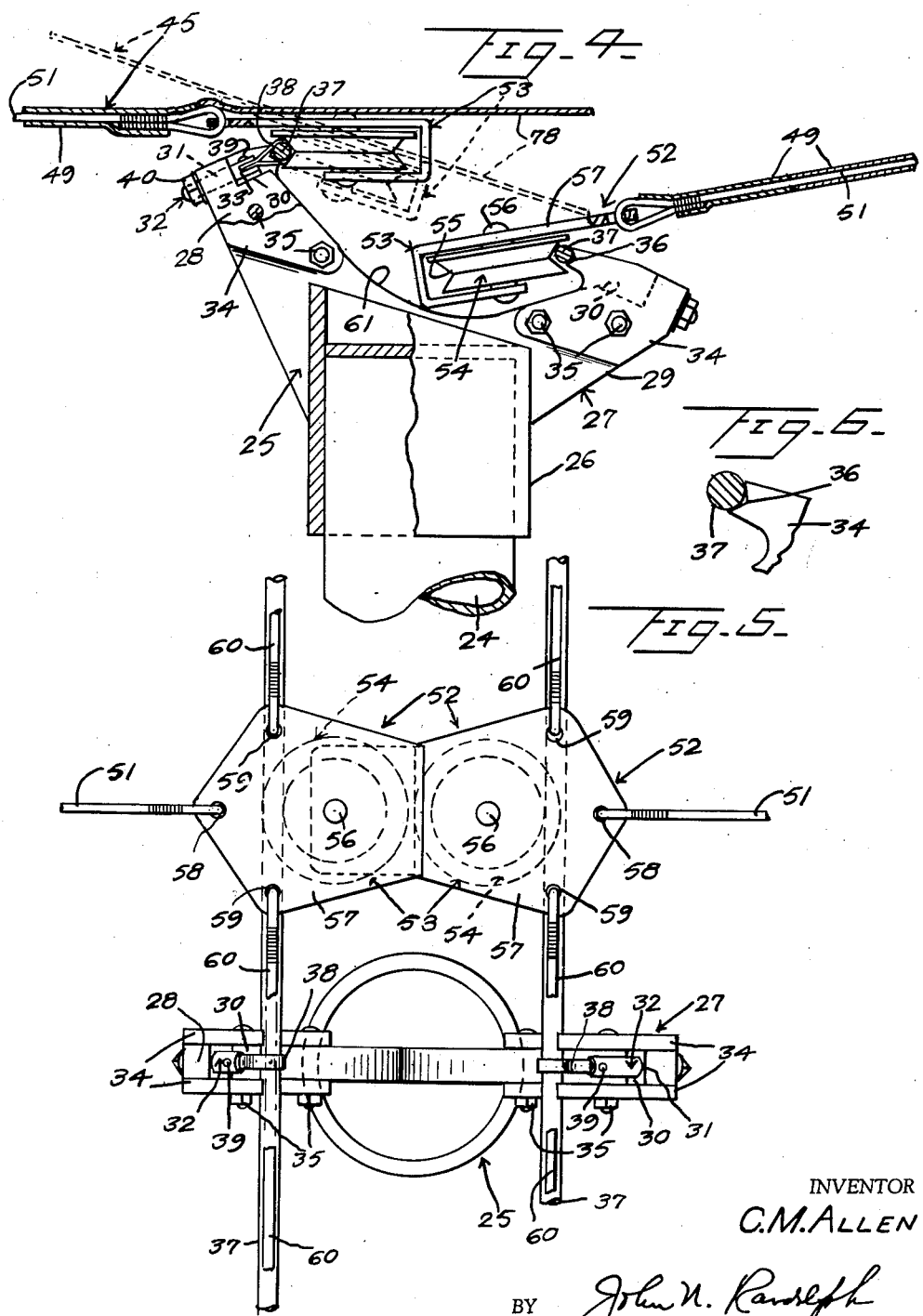

July 14, 1964    C. M. ALLEN    3,140,563
PROTECTIVE COVER FOR PLANTS
Filed April 3, 1963    4 Sheets-Sheet 4
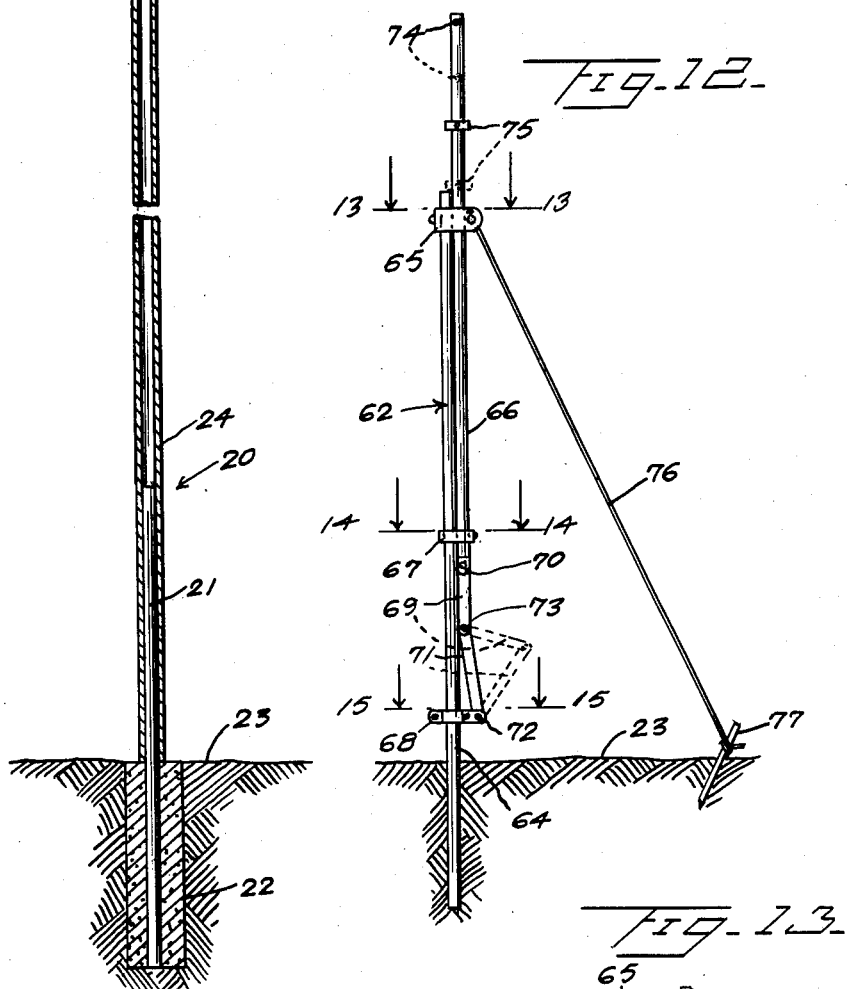
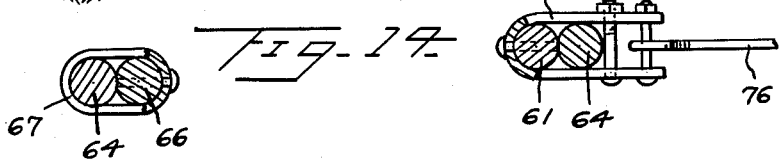
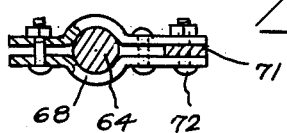
INVENTOR
C. M. ALLEN
BY John N. Randolph
ATTORNEY

United States Patent Office 3,140,563
Patented July 14, 1964

3,140,563
PROTECTIVE COVER FOR PLANTS
Clayton M. Allen, 1526 Cordova Ave., Holly Hill, Fla.
Filed Apr. 3, 1963, Ser. No. 270,418
9 Claims. (Cl. 47—20)

This invention relates to a cover primarily intended for protecting fruit trees from frost and freezing weather which causes considerable destruction and damage to growing fruits, especially in semi-tropical regions during the winter months.

More particularly, it is an aim of the present invention to provide a protective covering including a supporting structure along which the covering can be readily moved between an extended position over the plants and a retracted position, in which latter position the plants or trees are exposed to the sun and the elements when temperatures are not dangerously below normal.

A further object of the invention is to provide a supporting framework having novel means for movably supporting the extensible cover elements so that extension and retraction of such elements may be accomplished quickly and with a minimum of labor.

Still another object of the invention is to provide a protective covering which may be effectively utilized with heaters for confining and retaining the heat which would otherwise be quickly dissipated.

Various other objects and advantages of the invention will hereinafter become more fully apparent from the following description of the drawings, illustrating a presently preferred embodiment thereof, and wherein:

FIGURE 1 is a fragmentary diagrammatic view in perspective of the protective cover;

FIGURE 2 is a fragmentary diagrammatic view showing a portion of the cover in side elevation;

FIGURE 3 is a fragmentary diagrammatic view in top plan;

FIGURE 4 is an enlarged fragmentary vertical sectional view taken substantially along the line 4—4 of FIGURE 1;

FIGURE 5 is a fragmentary top plan view of a part of the structure as seen in FIGURE 4;

FIGURE 6 is an enlarged fragmentary side elevational view, partly in section, of a part of the structure as seen in FIGURE 4;

FIGURE 7 is an enlarged fragmentary sectional view taken substantially along the line 7—7 of FIGURE 1;

FIGURE 8 is an enlarged fragmentary top plan view of a part of one of the cover elements;

FIGURE 9 is a view similar to FIGURE 8 showing the parts of the cover element disconnected from one another;

FIGURE 10 is an enlarged cross sectional view taken substantially along the line 10—10 of FIGURE 8;

FIGURE 11 is an enlarged fragmentary vertical sectional view, partly in elevation, through one of the frame uprights;

FIGURE 12 is an enlarged side elevational view of one of the ridge pole supports, and FIGURES 13, 14 and 15 are enlarged cross sectional views taken substantially along planes as indicated by the lines 13—13, 14—14 and 15—15, respectively, of FIGURE 12.

Referring more specifically to the drawings, the protective cover in its entirety is designated generally 17 and is shown in FIGURE 1 in connection with a number of trees 18 which may constitute a part of a fruit orchard. However, as the description proceeds it will be understood that the protective cover may be utilized for protecting other forms of plants capable of being damaged by frost or sub-freezing weather or due to other natural causes.

The protective cover 17 includes a supporting frame, designated generally 19, including a plurality of uprights or posts 20 arranged in longitudinal rows extending generally from right to left of FIGURE 1. Each upright or post 20, as seen in FIGURE 11, includes a rigid rod-like member 21 having a lower portion which is anchored in concrete or the like 22 which is embedded in the ground 23, and so that a major portion of the rod-like member 21 extends vertically upward from the surface of the ground. Each post or upright 20 includes a tube or pipe 24 the lower portion of which fits slidably over the exposed portion of the element 21 and rests upon the anchoring block 22. Thus, by substituting tubular members 24 of different lengths the heights of the uprights or posts 20 may be varied, and it will be understood that all of the uprights or posts will ordinarily be of the same height.

A cable supporting head, as best seen in FIGURES 4 and 5, designated generally 25, is detachably mounted on the upper end of each post or upright 20. Each head 25 has a downwardly opening socket 26 which is sized to fit detachably on the upper end of the tubular member 24 of its post 20. A plate 27 is secured to the upper part of the socket 26 and extends diametrically thereof. The plate 27 has end portions defining upwardly inclined arms 28 and 29, the inner edges of which arms are notched as seen at 30 at their extremities. The portions of the arms 28 and 29 which extend from the vertically extending sides of the notches 30 are provided with bores 31 to slidably receive rods 32 having notched inner ends 33 which are disposed in said notches 30. Side plates 34 are disposed against both sides of each arm 28 and 29 and are secured thereto by nut and bolt fastenings 35. Portions of the plates 34 straddle the notches 30 and have parts extending inwardly therefrom. Said inwardly extending parts of each pair of the plates 34 are provided with aligned V-shape notches 36 to receive a part of a supporting cable 37. A nonelastic strap member 38 is looped around the part of the cable 37 located between the notches 36 and the ends of said looped strap are secured in the notch 33 of the rod 32 by a fastening 39. The exposed outer end of the rod 31 is threaded to receive a nut 40 which can be tightened for drawing the rod 32 outwardly of its arm 28 or 29 for pulling the support cable 37 into tight engagement with the spaced aligned notches 38. It will thus be seen that two transversely spaced substantially parallel supporting cables 37 are supported by the posts 20 of each longitudinal row of posts, said cables each being clamped to the head 25 of each post of the row. Accordingly, the plates 27 of the heads 25 are disposed crosswise of the longitudinal row of posts and of the support cables 37. It will also be noted that the support cable 37 supported by the arms 29 is disposed below the level of the cable 37 supported by the arms 28, for a purpose which will hereinafter become apparent. The support cables 37 extend beyond the end posts 20 of the row of posts supporting said cables, and have their end portions extending downwardly at inclines to form guys 41 which are anchored to the ground 23 by suitable anchoring stakes 42. The individual posts 20, especially those of the two outside rows of posts, may be provided with lateral guys 43 which are also secured to the ground by anchoring stakes 42, as seen in FIGURE 1.

An elongated flexible cover element 44 is disposed between and supported by the two adjacent support cables 37 of two adjacent rows of uprights 20. As viewed in FIGURE 1, five rows of uprights 20 are shown and which would normally provide a support for four cover elements 44; however, one of said cover elements has been omitted from FIGURE 1 at the far side of the view, for the purpose of clarity.

Each cover element 44 includes a plurality of corresponding panels 45 each of which is formed of a flameproof plastic, a suitable fabric, or a combination of the two. Each panel 45 is of elongated rectangular shape and extends crosswise of the cover element 44 of which it forms a part. Each flexible panel 45 has turned back ends forming tubular borders or end hems 46 as seen in FIGURES 8 and 9; and turned back side edges 47 and 48, parts of which form tubes or hems 49 and other parts of which form notches 50, as seen in FIGURE 9. The side edge 47 of each panel 45 is arranged contiguous with the side edge 48 of an adjacent panel 45 and the tubes or hems 49 of each side edge are received in the notches 50 of the other side edge, as seen in FIGURE 8, so that the tubes or hems 49 of the two side edges 47 and 48 are disposed in alignment to receive a lateral cable 51 which extends through said aligned tubes 49 and which combines therewith to form a hinge connection between the adjacent panels 45, as best seen in FIGURE 10.

The two ends of each transverse cable 51 are secured to two carriers, each designated generally 52, which form parts of the cover element 44. Each carrier 52, as seen in FIGURES 4 and 5, includes a U-shape plate 53 forming a frame or block for a pulley or sheave 54 having a V-shape groove 55 in its periphery. Said pulley or sheave 54 is journaled in the frame 53 on a bolt or axle 56. A top wall 57 of the frame 53 is elongated and widened so as to completely cover the sheave 54 and to extend beyond the periphery thereof, as seen in FIGURE 5, and is provided with a center opening 58 and aligned side openings 59. The ends of each transverse cable 51 are secured through the openings 58 of two transversely aligned carriers 52 of the cover element 44. Longitudinal cables 60 extend between the adjacent longitudinally aligned carriers 52 of the cover element 44 and are secured to said carriers 52 through openings 59 thereof. The cables 60 extend through the end hems 46 of the panels 45. Thus, each panel 45 is supported along its edges by two cables 51 and two cables 60, which cables are supported at their ends by four carriers 52 which are disposed adjacent the four corners of said panel 45. The carriers 52 disposed along one longitudinal side edge of each cover element 44 have the sheaves 54 thereof engaging a support cable 37 which is supported by the lower arms 29 of the heads 25 of a longitudinal row of uprights 20, and said carriers 52 are partially disposed in the recessed upper edge portions 61 of the heads 25, as seen in FIGURE 4. The other longitudinal row of carriers 52, disposed along the other longitudinal edge of the cover element 44, engage the support cable 37 of an adjacent row of uprights 20 and which support cable is disposed at a higher level than the aforementioned support cable, due to being supported by the longer arms 28, as seen in FIGURE 4. Thus, when the cover elements 44 are disposed in substantially horizontal positions they will possess a slight slope laterally or transversely thereof. The carriers 52 which engage the higher support cable 37 of each row of supporting heads 25 will normally partially overlie the carriers 52 which engage the lower support cable of the same heads 25, as seen in FIGURES 4 and 5.

The cover elements 44 have sufficient slack crosswise thereof so that the carriers 52 can be engaged with or disengaged from their support cables 37. For storing, alternate carriers 52 are disconnected from the support cables 37 and the remaining carriers 52 are manually moved along the support cables and onto the guys 41 at one end of the frame 19, as illustrated in FIGURES 2 and 3, wherein a portion of one cover element 44 is shown in a stored position. The longitudinal cables 60 include sections which extend from the end carriers 52 and which are manually pulled for either extending or retracting the cover elements 44. The cover elements 44 may be of a length greater than the lengths of the frame 19, if desired, so that the ends of the cover elements may extend down the guys 41 for closing the ends of the frame 19 or for partly closing an end of the frame as illustrated by an intermediate cover element in FIGURE 1, or said cover elements may extend down the guys 41 only at the windward end of the frame 19. The cables 60 extending from the ends of each cover element 44 may be anchored to the ground by suitable stakes, such as additional stakes 42' for holding the cover elements extended longitudinally. Also, if desired, strips 61 of a suitable flexible material, a portion of one of which strips is shown in FIGURE 1, may be extended along one or both sides of the frame 19 and may be supported in part by the lateral guys 43 which extend outwardly from the posts 20 of the frame side or sides.

A series of vertically extensible ridge forming uprights 62 are disposed midway between the longitudinal rows of uprights 20, and a longitudinally extending cable 63 is connected to the upper end of each of said uprights 62. As best illustrated in FIGURE 12, each extensible upright 62 includes a rod 64 having a lower end anchored in the ground for supporting said rod in an upright position. A guide 65 is secured to the upper portion of the rod 64 for slidably receiving a portion of a rod 66. The rod 66 carries a guide 67, near its lower end, which slidably engages the rod 64 between the guide 65 and a clamp 68, which clamp is secured to the rod 64 above and adjacent the ground. A link 69 has an upper end pivotally connected at 70 to the lower end of the rod 66, and a link 71 has a lower end pivotally connected at 72 to the clamp 68. The opposite, adjacent ends of the links 69 and 70 are pivotally connected together by a fastening 73 to form a knee joint. The upper end of the extensible rod 66 is provided with an opening 74. The cable 63 extends through the openings 74 of the intermediate upright 72 and is anchored to the opening 74 of the end uprights, of the row of uprights with which said cable is associated. Each upright 62 has an adjustable stop 75 which is secured to the extensible rod 66 above the upper end of the rod 64 for limiting the extent that the extensible rod 66 can be retracted. Guys 76 are secured to the end uprights 62 and extend outwardly and downwardly from the ends of the frame 19 to anchoring stakes 77 to prevent sagging of the cable 63.

All of the uprights 62 are in retracted positions as seen in dotted lines in FIGURE 12, while the cover element 44 is being moved thereover to an extended or retracted position. This is illustrated in full lines in FIGURE 2, wherein one of the cables 63 can be seen disposed below the level of the support cables 37 and the carriers 52. Each upright 62 is moved to its retracted, dotted line position, as seen in FIGURE 12, by pulling the knee joint 73 outwardly from the rod 64 to partially fold the links 69 and 71 to their dotted line positions and thereby retract or lower the rod 66 until the abutment 75 engages on the rod 64. After the cover element 44 has been extended, it will be noted that said cover element will sag transversely, as seen in full lines in FIGURE 2. However, by thereafter extending the uprights 62 the cable 63 will be elevated above the level of the support cables 37 to form a ridge on which the longitudinal medial portion of the cover element 44 rests, so that said cover element will slope transversely from its longitudinal center toward each side edge thereof, as illustrated in FIGURE 1 and in dotted lines in FIGURE 2. Accordingly, moisture will not collect on the extended cover elements but will drain toward and from the side edges thereof.

The end of each panel 45 of each cover element 44, which is disposed adjacent the more elevated of the two support cables 37, by which said cover element 44 is supported, is provided with a relatively stiff fabric extension 78. Said fabric extensions 78 extend outwardly over the lower side edge of an adjacent cover element 44 when the ridge forming cables 63 are in lowered positions. However, when the ridge forming cables 63 are raised, the strips or extensions 78 will overlie the lower side edge of the next adjacent cover element 44 for covering the gap between adjacent longitudinal edges of adjacent cover elements 44, as defined by the spacing between the longitudinal cables 60 of the adjacent edges of said two cover elements, as seen in FIGURE 5. However, the strips 78 will not prevent drainage from the side edge of the cover element which said strip 78 overlies.

It will be readily apparent that a torn or otherwise damaged panel 45 of a cover element 44 may be readily removed and replaced by merely disconnecting the cables 51 and 60 from the hems or tubular portions 49 and 46, respectively, which are associated with said panel, after which a new panel can be inserted.

The extended cover elements 44 will protect the trees or plants disposed therebeneath or therewithin from frost and the affects of freezing temperatures by confining the warmth from the ground. In addition, where heaters are employed, the extended cover elements 44 will confine the heat and prevent its escape to the atmosphere and will prevent the heat from being carried away from the plants or trees by the wind. It will also be apparent that the cover elements may be utilized to afford shade to trees or plants under extremely hot and dry conditions.

Various modifications and changes are contemplated and may obviously be resorted to, without departing from the function or scope of the invention as hereinafter defined by the appended claims.

I claim as my invention:

1. A protective cover for plants comprising at least two transversely spaced substantially parallel rows of uprights each including a plurality of longitudinally spaced uprights, at least one supporting cable connected to and supported by an upper portion of each upright of a row of said uprights; at least one elongated cover element composed of a plurality of interconnected panels each formed of a flexible nonelastic material and each extending from side-to-side of the cover element, a plurality of carriers connected to each side edge of said cover element, said carriers including sheaves engaging said supporting cables for supporting the cover element extended transversely between the supporting cables of the two rows of uprights, said sheaves being movable along said supporting cables for extending the cover element over plants disposed between the rows of uprights or to a retracted position adjacent complementary ends of the rows of uprights for exposing the plants.

2. A protective cover for plants as in claim 1, and vertically extensible ridge forming means disposed between said rows of uprights and engaging and elevating the longitudinal medial portion of said cover element, relative to the side edge portions thereof, when said ridge forming means is extended vertically.

3. A protective cover for plants as in claim 1, said panels having sleeve portions along the margins thereof, nonelastic flexible elements engaging through said sleeve portions and anchored at their ends to said carriers, said carriers being disposed adjacent the corners of each of the panels, and adjacently disposed panels having interfitting sleeve portions through which the flexible elements, which are disposed crosswise of said cover element, extend to form hinge connections between the adjacent panels.

4. A protective cover for plants as in claim 3, alternate carriers of each side edge of the cover element being disengageable from the support cables for storing the cover element in the retracted position with the panels disposed in pleat-like folds.

5. A protective cover for plants as in claim 4, said support cables having extensions projecting beyond the ends of the rows of uprights and forming guys for receiving the folded cover element for storage.

6. A protective cover as in claim 5, an end portion of the extended cover element being supported by the guys at one end of the frame to provide a protective side covering.

7. A protective cover for plants comprising at least three rows of longitudinally spaced uprights, said rows of uprights being disposed in spaced apart substantially parallel relation to one another, cable supporting heads mounted on the upper ends of said uprights, the heads of at least the intermediate row of said uprights each having two laterally spaced cable supporting arms, two laterally spaced substantially parallel supporting cables supported by said arms, cable clamping means releasably clamping said cables to said arms, one arm of each head being disposed above the level of the other arm for positioning said cables at different elevations, at least one supporting cable supported by the uprights of each of said outer rows of uprights, means for mounting said last mentioned supporting cables above the uprights of said outer rows, at least two elongated cover elements of flexible material, carriers comprising pulley frames and sheaves attached to the side edges of the flexible material of the cover elements at longitudinally spaced points, the carriers disposed along the remote side edges of said cover elements having their sheaves engaging the supporting cables of the outer rows of uprights, and the carriers of the adjacent side edges of said cover elements engaging the supporting cables of said intermediate row of uprights, one of said cover elements having a strip extending laterally therefrom beyond the carriers thereof which engage the higher supporting cable of said intermediate row of uprights and which strip overlies the adjacent edge of the other cover element for covering the gap between the adjacent longitudinal edges of said cover elements.

8. A protective cover as in claim 7, and vertically extensible ridge forming means extending between said rows of uprights and engaging under and raising the longitudinal medial portions of the cover elements when said ridge forming means are in raised positions for causing the cover elements to slope laterally toward both side edges thereof.

9. A protective cover for plants as in claim 7, each of said cover elements being composed of panel-like sections extending crosswise thereof, and flexible elements extending between transversely aligned carriers of said cover element and engaging edge portions of adjacent panel-like sections and forming hinge joint connections between said adjacent sections.

References Cited in the file of this patent

UNITED STATES PATENTS

| 711,225 | Putnam et al. | Oct. 14, 1902 |
| 727,541 | Hayes | May 5, 1903 |
| 1,081,482 | Barrott | Dec. 16, 1913 |
| 2,118,474 | Morton | May 24, 1938 |
| 2,835,931 | Sterkin | May 27, 1958 |
| 3,100,950 | Heuer | Aug. 20, 1963 |

FOREIGN PATENTS

| 567,364 | Belgium | May 31, 1958 |
| 443,840 | France | Oct. 3, 1912 |